(12) United States Patent
Chen et al.

(10) Patent No.: US 10,599,480 B2
(45) Date of Patent: Mar. 24, 2020

(54) CASCADING JOB SCHEDULING IN GUESTS

(71) Applicant: Red Hat, Inc., Raleigh, NC (US)

(72) Inventors: Huamin Chen, Westborough, MA (US); Jay Vyas, Concord, MA (US)

(73) Assignee: Red Hat, Inc., Raleigh, NC (US)

( * ) Notice: Subject to any disclaimer, the term of this patent is extended or adjusted under 35 U.S.C. 154(b) by 140 days.

(21) Appl. No.: 15/587,613

(22) Filed: May 5, 2017

(65) Prior Publication Data

US 2018/0321976 A1 Nov. 8, 2018

(51) Int. Cl.
*G06F 9/50* (2006.01)
*H04L 29/08* (2006.01)

(52) U.S. Cl.
CPC .............. *G06F 9/505* (2013.01); *H04L 67/10* (2013.01); *H04L 67/1008* (2013.01); *H04L 67/32* (2013.01)

(58) Field of Classification Search
CPC ....................................................... G06F 9/505
See application file for complete search history.

(56) References Cited

U.S. PATENT DOCUMENTS 9,317,328 B2 4/2016 Jamjoom et al.
9,444,695 B2 9/2016 Dutta et al.
2006/0012822 A1* 1/2006 Matsumoto ............. G06T 15/08 358/1.15
2007/0011683 A1* 1/2007 Helander .............. G06F 9/4887 718/104
2008/0007765 A1* 1/2008 Ogata .................... G06F 9/4843 358/1.15
2014/0047342 A1 2/2014 Breternitz et al.
2014/0095691 A1 4/2014 Ganguli et al.
2014/0289733 A1* 9/2014 Fritz ..................... G06F 9/5066 718/104

FOREIGN PATENT DOCUMENTS

CN 102611723 A 7/2012

* cited by examiner

*Primary Examiner* — Sisley N Kim
(74) *Attorney, Agent, or Firm* — K&L Gates LLP (57) ABSTRACT

Cascading job scheduling in guests is disclosed. For example, first, second, third, and fourth nodes, each execute respective first, second, third, and fourth pluralities of guests each of which executes respective first, second, third, and fourth pluralities of jobs. A scheduler executes on a processor to receive a current capacity update of the first node. A respective quantity of jobs executing on each of the first, second, third, and fourth nodes is tracked. A first, second, third, and fourth estimated capacity of the respective first, second, third, and fourth nodes is calculated. The first, second, third, and fourth nodes are ranked in a list based on the respective estimated capacities. A request to execute a job is received. The first, second, and third nodes are selected as a schedulable set based on the list. A schedulable set notice and the job are sent to the first node to be executed.

20 Claims, 5 Drawing Sheets

CASCADING JOB SCHEDULING IN GUESTS

BACKGROUND

The present disclosure generally relates to scheduling tasks to be executed by isolated guests in a network environment. In computer systems, it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests allow a programmer to quickly scale the deployment of applications to the volume of traffic requesting the applications. Isolated guests may be deployed in a variety of hardware environments. There may be economies of scale in deploying hardware in a large scale. To attempt to maximize the usage of computer hardware through parallel processing using virtualization, it may be advantageous to maximize the density of isolated guests in a given hardware environment, for example, in a multi-tenant cloud. In many cases, containers may be leaner than virtual machines because a container may be operable without a full copy of an independent operating system, and may thus result in higher compute density and more efficient use of physical hardware. Multiple containers may also be clustered together to perform a more complex function than the containers are capable of performing individually. In an example, a container and/or a cluster of containers may be implemented specifically to execute certain specific tasks and/or types of tasks. A scheduler may be implemented to allocate containers and clusters of containers to a host, the host being either a physical host or a virtual host such as a virtual machine. Typically, a container is significantly lighter weight than a virtual machine, and may be hosted in a virtual machine, allowing for additional flexibility and scalability of deployment. A scheduler may also be implemented to assign tasks to be executed by the isolated guests (e.g., containers and/or virtual machines).

SUMMARY

The present disclosure provides a new and innovative system, methods and apparatus for cascading job scheduling in guests. In an example, a plurality of nodes, including first, second, third, and fourth nodes, each execute separate pluralities of guests, including first, second, third, and fourth pluralities of guests on the respective first, second, third, and fourth nodes, where each plurality of guests executes a respective plurality of jobs including first, second, third, and fourth pluralities of jobs. A scheduler may execute on a processor. In an example, the scheduler receives a current capacity update of the first node. A respective quantity of jobs executing on each of the first, second, third, and fourth nodes is tracked. A first, second, third, and fourth estimated capacity of the respective first, second, third, and fourth nodes is calculated. The first, second, third, and fourth nodes are ranked in a list based on the first, second, third, and fourth estimated capacities. A request to execute a job is received and the first, second, and third nodes are selected as a schedulable set based on the list. A schedulable set notice and the job are sent to the first node to be executed.

Additional features and advantages of the disclosed method and apparatus are described in, and will be apparent from, the following Detailed Description and the Figures.

DETAILED DESCRIPTION OF EXAMPLE EMBODIMENTS

In computer systems utilizing isolated guests, typically, virtual machines and/or containers are used. In an example, a virtual machine ("VM") may be a robust simulation of an actual physical computer system utilizing a hypervisor to allocate physical resources to the virtual machine. In some examples, a container based virtualization system such as Red Hat® OpenShift® or Docker® may be advantageous as container based virtualization systems may be lighter weight than systems using virtual machines with hypervisors. In the case of containers, oftentimes a container will be hosted on a physical host or virtual machine that already has an operating system executing, and the container may be hosted on the operating system of the physical host or VM. In large scale implementations, container schedulers, such as those included in container orchestrators (e.g., Kubernetes®), generally respond to frequent container startups and clean-ups with low latency. Containers may allow wide spread, parallel deployment of computing power for specific tasks. In a typical example, a container may be instantiated to process a specific task and reaped after the task is complete.

Due to economies of scale, containers tend to be more advantageous in large scale hardware deployments where the relatively fast ramp-up time of containers allows for more flexibility for many different types of applications to share computing time on the same physical hardware, for example, in a private or multi-tenant cloud environment. In some examples, where containers from a homogenous source are deployed, it may be advantageous to deploy containers directly on physical hosts. In a multi-tenant cloud, it may be advantageous to deploy containers and groups of containers within virtual machines as the hosting service may not typically be able to predict dependencies for the containers such as shared operating systems, and therefore, using virtual machines adds flexibility for deploying containers from a variety of sources on the same physical host. Typically, while containers may be light weight and disposable, at least some of the data that is processed by the container or data that results from the processing of the container may be persistent data. In an example, for processing more complex tasks, multiple containers may be grouped together into container clusters (e.g., Kubernetes® pods), that are deployed together and function as an interconnected whole. For example, a cluster of containers may be deployed, each responsible for handling one or more processing steps between an original input and a final output after the entire cluster is finished acting on the input whether in series or in parallel.

In some large scale deployments, further efficiencies may be realized by leveraging light weight guests such as containers to perform parallel processing for various discrete, typically commoditized, processing tasks (e.g., functions, jobs, tasks, sub-routines). In a typical example, an asynchronous task, especially one where the requestor either does not require a response at all or only requires a response in the future for a failure to perform, may be a prime candidate for being sent off to a general purpose container for execution. In an example, a physical and/or virtual host nodes may host hundreds of containers, each of which may independently execute tasks. In an example, a scheduler may be used to allocate tasks to the various host nodes in communication with the scheduler to be executed on containers on the various host nodes.

In some implementations, anonymous jobs may be supported. Anonymous jobs (e.g., anonymous functions, lambda functions, Azure® functions, cloud functions, etc.) are supported in many commonly used programming languages such as C#®, Java®, JavaScript®, MATLAB®, Perl®, PHP®, Python®, Visual Basic®. An anonymous function is a function in code that is not named, and therefore, typically the anonymous function may not be reusable, and may rather be typically invoked exactly where it is located in the code. Typically, anonymous functions are used where their use may improve the human readability and/or performance of the code. For example, simple tasks such as sorting a list or retrieving a value may often be implemented inline in the code where the results are needed rather than declaring a named function and then invoking the named function. In an example, in a source code file with 100 functions, especially where numerous functions may be handling similar tasks, assigning meaningful names to each may needlessly crowd the namespace, resulting in either meaningless names or very long names. For example, in a block of code handling math relating to time in different formats, a function to add two times may be named function addTimes. In another example, the same function may be named function addTwoTimesIn24HourFormat. In an example, the shorter addTimes name may quickly become confusing if there were other functions handling the addition of time in other formats or with different amounts of inputs. However, the longer addTwoTimesIn24HourFormat name may be more descriptive, but require more characters and therefore more memory. In an example, if the function were only called in one specific context and not reused, avoiding naming the function at all and using an anonymous function instead may be beneficial from a clarity and memory usage perspective. In the example, by using an anonymous function in the proper context, a descriptive name may be superfluous. In a source code file with hundreds or thousands of functions, implementing anonymous functions may therefore save hundreds of KB even MB in the file size. In scripting languages, these memory savings may translate directly to file transfer and execution time savings. In a typical example, certain features of a website may be implemented in JavaScript®, and the site may be optimized for loading speed. In the example, an aggregate savings in size of implementing features with anonymous functions may reduce the size of the source code for the website by several KB resulting in several ms of reduced loading times especially for slower connections such as mobile connections.

However, significant disadvantages may be encountered when anonymous jobs are sent to a scheduler for parallel processing on a container. For example, with a named function, the scheduler may track statistics on the computing resources (e.g., processor cycles, memory usage, persistent storage usage, etc.) required to handle the named function and may therefore predictably determine whether a certain node has capacity to handle the function. With anonymous functions, such prediction is impossible before the code is interpreted, which may be inefficient for a scheduler since interpreting the code may make the scheduler a significant bottleneck possibly to the point of defeating the advantages of using containers for parallel processing. Without interpretation, a scheduler may have difficulty assigning anonymous jobs to nodes for processing without overprovisioning, which leads to lower total system efficiency. For example, the scheduler may be unable to distinguish an anonymous job that would take 1 ms of processing time (e.g., a simple function to sort several inputs) vs. one that would take upwards of 2 minutes (e.g., a timeout of 2 minutes may be set for a function that waits for responses from further dependencies). In addition, waiting for an acknowledgement of the job being successfully scheduled may typically add 2 ms-10 ms to a job scheduling cycle due to network latency, even where a first node that receives the job accepts the job. In an example where a scheduler is responsible for scheduling jobs on hundreds, or even thousands of nodes, these bits of latency add up to significant performance degradation and throughput issues during periods of high traffic.

The present disclosure aims to address existing challenges in scheduling jobs to be executed in isolated guests by enabling cascading job scheduling in guests. In an example, nodes hosting containers may periodically report current capacity data to a scheduler, which may then assign jobs, especially anonymous jobs to the nodes based on the capacity reports. In the example, without further analysis, there may be a significant likelihood that the first node to receive a job may have insufficient capacity to process the job by the time the job is received, due to the scheduler operating on aged capacity data. In the example, rather than a scheduler determining that a node has a high likelihood of having capacity, then sending the job to the node awaiting a response, a scheduler performing cascading job scheduling in guests may periodically be updated with a current capacity, and then the scheduler may select a schedulable set of multiple nodes where it is likely that at least one node has enough capacity to execute the job. For example, if two nodes each have a 90% chance of having space, then combined together, the odds of both nodes not having space becomes only 1%. In the example, adding a third node drops the odds to 0.1%. In an example, rather than the scheduler awaiting feedback, with a sufficient confidence level in the schedulable set, the scheduler can send the job with the schedulable set without requiring an acknowledgement that the job has been processed. For example, the scheduler may be confident that a job will be handled by at least one node in the schedulable set upon confirmation of receipt by the first node in the schedulable set, and may therefore "fire and forget" jobs rather than keeping resources locked up waiting for a response after processing begins on the job. Upon receiving the job and the schedulable set, the first node listed on the schedulable set determines whether the first node has capacity, and if the first node does not have capacity, it forwards the schedulable set and the job to the second node on the schedulable set. In this way, the scheduler is only notified if the entire schedulable set is incapable of fulfilling the request (e.g., the request requires rescheduling). In an example, the job cascades down the schedulable set like water down a tiered waterfall, only involving the scheduler again if none of the nodes in the schedulable set can handle the requested job. By shifting the bulk of the determination regarding whether a node has capacity to the nodes, which may typically be hosted separately from the scheduler, a rate limiting bottleneck in scheduler operation may be performed in parallel by dozens or hundreds of nodes at once. By additionally removing a network hop to reschedule a failed request (e.g., removing a rejection from the first node to the scheduler), and enabling a request to execute a job to dynamically reschedule itself, parallel processing of rescheduling is additionally enabled as well.

Figure 1:
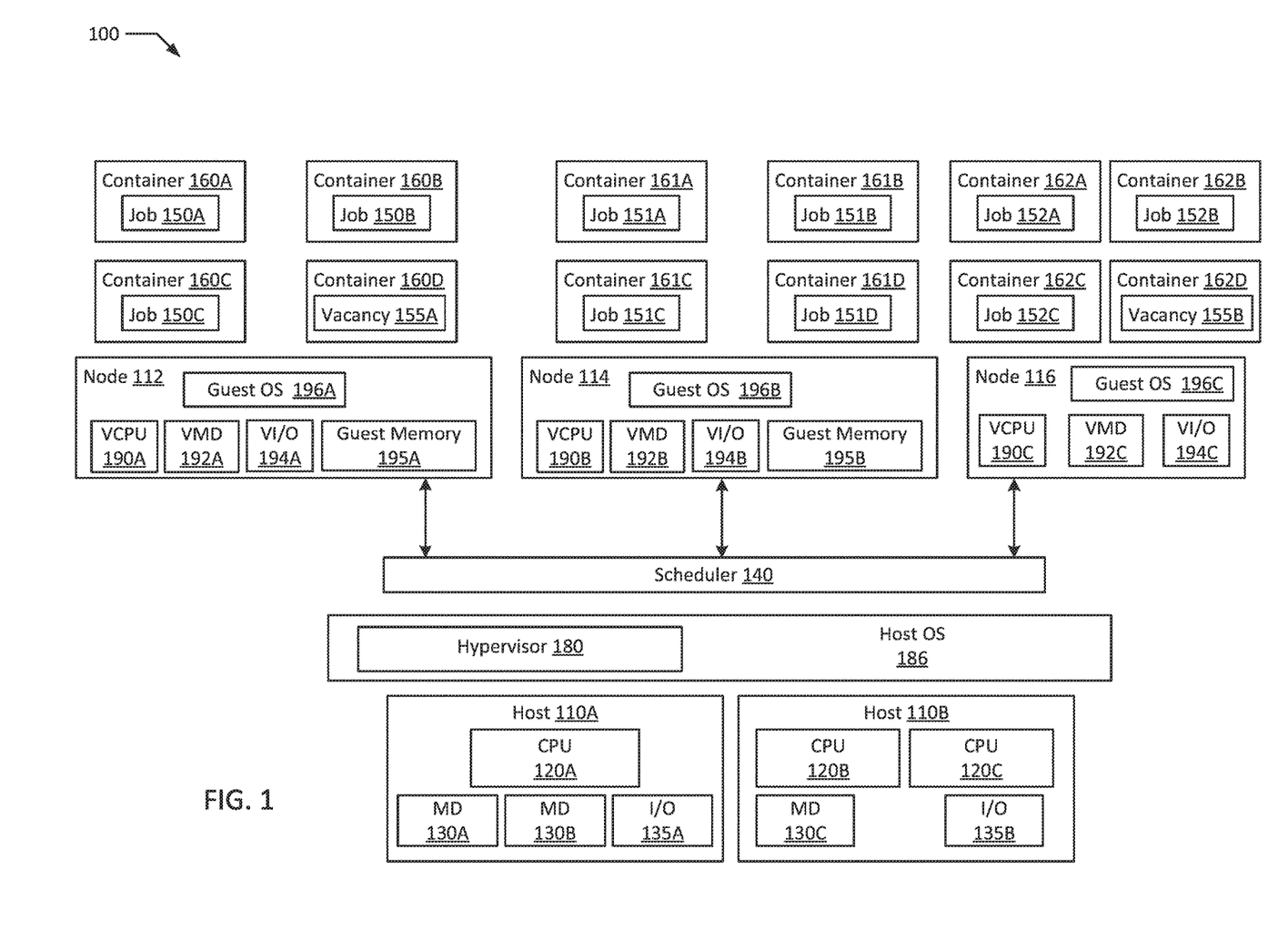
FIG. 1 is a block diagram of a cascading job scheduling in guests system according to an example of the present disclosure.

FIG. 1 is a block diagram of a cascading job scheduling in guests system according to an example of the present disclosure. The system 100 may include one or more interconnected hosts 110A-B. Each host 110A-B may in turn include one or more physical processors (e.g., CPU 120A-C) communicatively coupled to memory devices (e.g., MD 130A-C) and input/output devices (e.g., I/O 135A-B). As used herein, physical processor or processors 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, a memory device 130A-C refers to a volatile or non-volatile memory device, such as RAM, ROM, EEPROM, or any other device capable of storing data. As discussed herein, I/O device 135A-B refer to devices capable of providing an interface between one or more processor pins and an external device, the operation of which is based on the processor inputting and/or outputting binary data. CPUs 120A-C may be interconnected using a variety of techniques, ranging from a point-to-point processor interconnect, to a system area network, such as an Ethernet-based network. Local connections within each host 110A-B, including the connections between a processor 120A and a memory device 130A-B and between a processor 120A and an I/O device 135A may be provided by one or more local buses of suitable architecture, for example, peripheral component interconnect (PCI).

In an example, hosts 110A-B may run one or more isolated guests, for example, containers 160A-D, 161A-D, 162A-D and nodes 112, 114, and 116. In an example, any of containers 160A-D, 161A-D, 162A-D may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, a given service may require the deployment of multiple containers and/or pods in multiple physical locations. In an example, nodes 112, 114, and 116 may be VMs executing on hosts 110A-B. In an example, containers 160A-D may execute on node 112, containers 161A-D may execute on node 114, and containers 162A-D may execute on node 116. In an example, any of containers 160A-D, 161A-D, 162A-D may be executing directly on either of hosts 110A-B without a virtualized layer in between. In an example, scheduler 140 may be part of a container orchestrator such as Kubernetes® or Docker Swarm®, which may execute directly on host operating system ("OS") 186. In another example, a scheduler 140 (e.g., Kubernetes® scheduler) may execute on a separate host system, for example across a network from hosts 110A-B. In an example, scheduler 140, may be an application that schedules, launches, and/or manages isolated guests (e.g., containers 160A-D, 161A-D, 162A-D and/or nodes 112, 114, and 116). In an example, isolated guests may be further nested in other isolated guests. For example, VMs (e.g., nodes 112, 114, and 116) may host containers (e.g., containers 160A-D, 161A-D, 162A-D). In addition, containers and/or VMs may further host other guests necessary to execute their configured roles. For example, a VM (e.g., node 112, 114, 116) and/or a container (e.g., container 160A-D, 161A-D, 162A-D) may further host a Java® Virtual Machine ("JVM") if execution of Java® code is necessary.

System 100 may run one or more VMs (e.g., nodes 112, 114, and 116), by executing a software layer (e.g., hypervisor 180) above the hardware and below the nodes 112, 114, and 116, as schematically shown in FIG. 1. In an example, the hypervisor 180 may be a component of the host operating system 186 executed by the system 100. In another example, the hypervisor 180 may be provided by an application running on the operating system 186, or may run directly on the hosts 110A-B without an operating system beneath it. The hypervisor 180 may virtualize the physical layer, including processors, memory, and I/O devices, and present this virtualization to nodes 112, 114, and 116 as devices, including virtual central processing units ("VCPUs")190A-C, virtual memory devices ("VMDs")192A-C, virtual input/output ("VI/O") devices 194A-C, and/or guest memories 195A-C. In an example, a container may execute directly on host OS 186 without an intervening layer of virtualization.

In an example, a node 112 may be a virtual machine and may execute a guest operating system 196A which may utilize the underlying VCPU 190A, VMD 192A, and VI/O 194A. One or more isolated guests (e.g., containers 160A-D) may be running on node 112 under the respective guest operating system 196A. Processor virtualization may be implemented by the hypervisor 180 scheduling time slots on one or more physical processors 120A-C such that from the guest operating system's perspective those time slots are scheduled on a virtual processor 190A.

Node 112 may run on any type of dependent, independent, compatible, and/or incompatible applications on the underlying hardware and host operating system 186. In an example, containers 160A-D running on node 112 may be dependent on the underlying hardware and/or host operating system 186. In another example, containers 160A-D running on node 112 may be independent of the underlying hardware and/or host operating system 186. In an example, containers 160A-D running on node 112 may be compatible with the underlying hardware and/or host operating system 186. Additionally, containers 160A-D running on node 112 may be incompatible with the underlying hardware and/or OS. The hypervisor 180 may manage memory for the host operating system 186 as well as memory allocated to the node 112 and guest operating system 196A such as guest memory 195A provided to guest OS 196. In an example, persistent storage 135 may be provisioned from network storage 170 located across network 105 from VM 112, and persistent storage 135 may be mounted to VM 112. In some examples, scheduler 140 and hosts 110A-B may reside over a network from each other, which may be, for example, a public network (e.g., the Internet), a private network (e.g., a local area network (LAN) or wide area network (WAN)), or a combination thereof.

In an example, nodes 112, 114, and 116 each host a plurality of guest systems (e.g., containers 160A-D, 161A-D, 162A-D) which may in turn execute jobs (e.g., jobs 150A-C, 151A-D, and 152A-C) in parallel. In an example, vacancies 155A-B may represent available processing slots that are not currently executing any jobs. In the example, container 160D and container 162D may be awaiting new jobs from scheduler 140. In an example, containers 160A-D, 161A-D, 162A-D may be configured to execute anonymous jobs sent to nodes 112, 114, and 116 from scheduler 140. In an example, nodes 112, 114, and 116 may also host other guests such as JVMs that may also be used to execute jobs similarly to containers 160A-D, 161A-D, 162A-D. In an example, containers 160A-D, 161A-D, 162A-D may additionally host other guests (e.g., JVMs) as necessary to execute jobs 150A-C, 151A-D, and 152A-C. In an example, some of jobs 150A-C, 151A-D, and 152A-C may be named jobs rather than anonymous jobs. In an example, containers 160A-D, 161A-D, 162A-D may each be configured to handle one job at a time. In another example, containers 160A-D, 161A-D, 162A-D may be configured with queues to queue up multiple jobs for execution.

Figure 2:
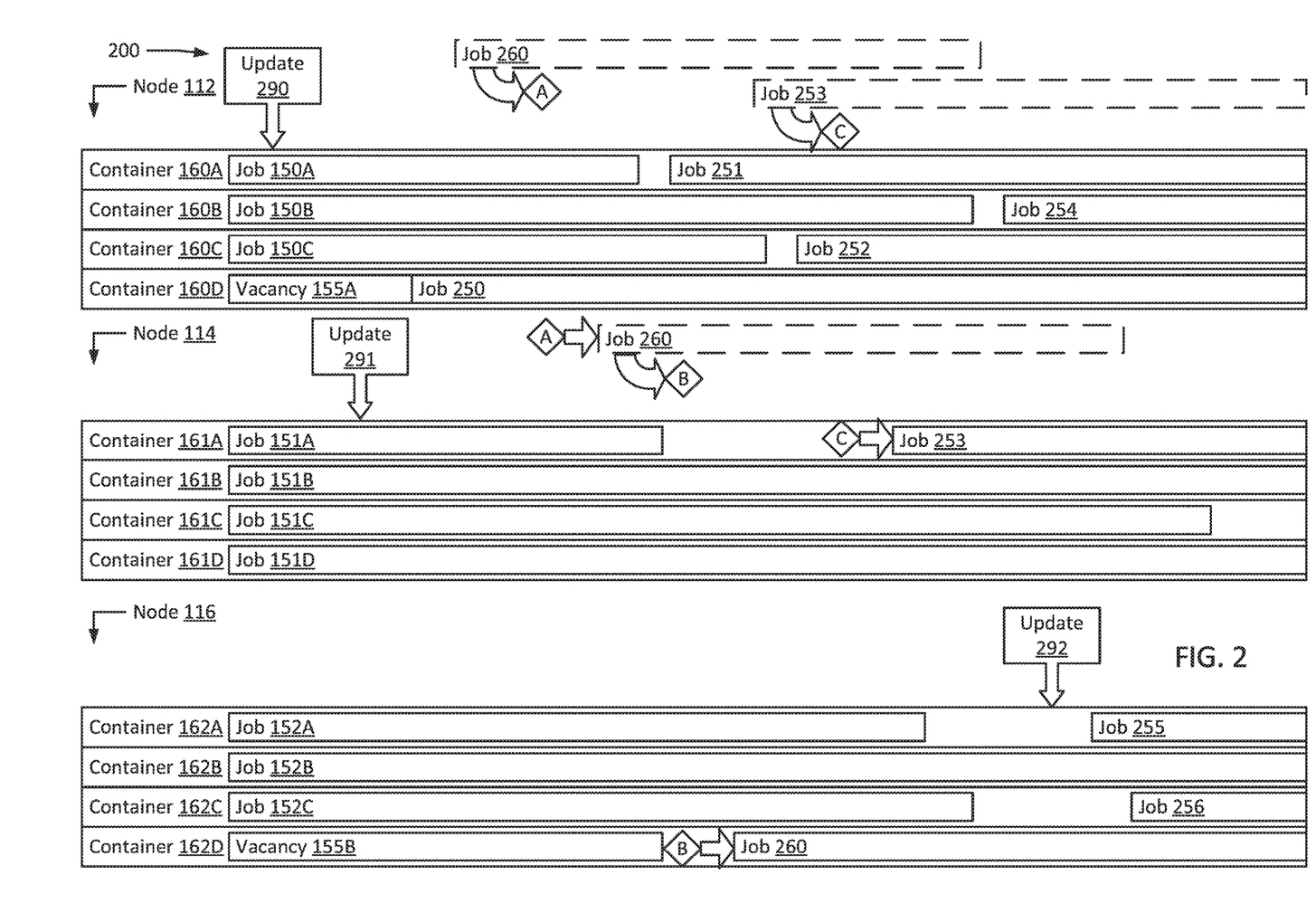
FIG. 2 is a timing diagram illustrating cascading job scheduling in guests by a system according to an example of the present disclosure.

FIG. 2 is a timing diagram illustrating cascading job scheduling in guests by a system according to an example of the present disclosure. Illustrated example system 200 in FIG. 2 is an expanded view of containers 160A-D, 161A-D, and 162A-D executing jobs over time, including the cascading rescheduling of job 260. In an example, containers 160A-D may execute on node 112, containers 161A-D may execute on node 114, and containers 162A-D may execute on node 116. In an example, at a given time, job 150A may execute on container 160A, job 150B may execute on container 160B, job 150C may execute on container 160C, job 151A may execute on container 161A, job 151B may execute on container 161B, job 151C may execute on container 161C, job 151D may execute on container 161D, job 152A may execute on container 162A, job 152B may execute on container 162B, and job 152C may execute on container 162C. In the example, container 160D may have vacancy 155A, and container 162D may have vacancy 155B. In an example, node 112 may have recently updated scheduler 140 that node 112 had a vacancy (e.g., vacancy 155A on container 160D) via update 290. In the example, each of nodes 112, 114, and 116 may periodically update (e.g., updates 290-292) their respective vacancies to scheduler 140. For example, node 114 may have reported no vacancies in update 291, while node 116 may have reported vacancy 155B earlier than node 112 reporting vacancy 155A. In the example, scheduler 140 may extrapolate based on average execution times for anonymous jobs in system 200, that node 112 should have at least one vacancy as reported and likely two vacancies as another job likely finished since the last update, node 114 should have at least one vacancy since jobs 151A-D have all been executing longer than average at the time of the last update, and that, while multiple jobs had been sent to node 116 since the last update, node 116 should have at least one vacancy due to average execution times as well. In an example, scheduler 140 may determine that the likelihood of node 112 having a vacancy was highest since an actual vacancy was recently reported in update 290, with node 114 having a slightly lower likelihood of vacancy compared to node 112 and then node 116 with a slightly lower likelihood of vacancy compared to node 114. In the example, to execute a job 250, a schedulable set of node 112, followed by node 114, followed by node 116 may be generated by scheduler 140, and job 250 may be sent to node 112 with the schedulable set. In the example, job 250 takes the place of vacancy 155A and is executed on container 160D.

In an example, scheduler 140 may base determinations for schedulable sets solely on updated vacancies, and may allow nodes 112, 114, and 116 to shuffle around any jobs that are overscheduled by cascading the jobs down their respective schedulable sets. In an example, an interval between updates (e.g., updates 290-292) may be increased as the number of nodes scheduled by scheduler 140 increases, for example, to avoid bogging down scheduler 140 with update messages. In an example, as update intervals become longer, scheduler 140 may extrapolate current capacity on a node, for example, by factoring in average completion rates for jobs to estimate current capacity. In various examples, a mean, median, or mode, either weighted or unweighted may be most representative of the completion rates of anonymous jobs in a given system 200. In some examples, scheduler 140 may factor in additional statistical modeling such as standard deviations or variance.

In an example, a schedulable set notice sent accompanying a job to be scheduled may include every node in the schedulable set selected by scheduler 140. In the example, a given node may retrieve the next node from the schedulable set by first finding the node's own position in the schedulable set. In another example, scheduler 140 and/or any of the nodes in the schedulable set (e.g., nodes 112, 114, and 116) may exclude some members of the schedulable set from a schedulable set notice. For example, a schedulable set notice may include only untried nodes in the schedulable set. In the example, scheduler 140 may send a schedulable set notice to node 112 that does not include node 112, but rather only includes nodes 114 and 116. A subsequent schedulable set notice from node 112 to node 114 may then include just node 116. In such an example, a receiving node may infer that the receiving node is the highest remaining member of the schedulable set. In an example, scheduler 140 may be configured to construct schedulable sets with a given probability threshold for successful scheduling. In the example, depending on the state of the information the scheduler 140 has regarding the current capacities of various nodes, a schedulable set may be longer or shorter. For example, a confidence level of 99% may be reached with two nodes in a schedulable set where each node has a 90% chance of scheduling the job. Alternatively, the same 99% confidence level may be reached by combining nodes with a schedulable set of 5 nodes with 80%, 70%, 60%, 50%, and 40% chances of scheduling the job.

In an example, job 260 then requires scheduling before any further updates on current capacity. In the example, based on the data available, job 260 may be sent with a schedulable set notice including the same nodes as job 250 to node 112. When job 260 arrives at node 112, there may be no remaining capacity, and node 112 may forward job 260 to node 114 based on the schedulable set. Node 114 may again determine that there is no capacity and forward job 260 to node 116 where container 162D executes job 260. In an example, jobs 251 and 252 may subsequently be received by node 112 and execute on containers 160A and 160C in place of completed jobs 150A and 150C respectively. A job 253 may then be forwarded to node 114 by node 112 due to capacity constraints before job 254 is once again accepted by node 112 on container 160B. In an example, node 116 then sends an update 292 to scheduler 140 indicating two vacancies, and jobs 255 and 256 are sent directly to node 116 to execute on containers 162A and 162C respectively.

Figure 3:
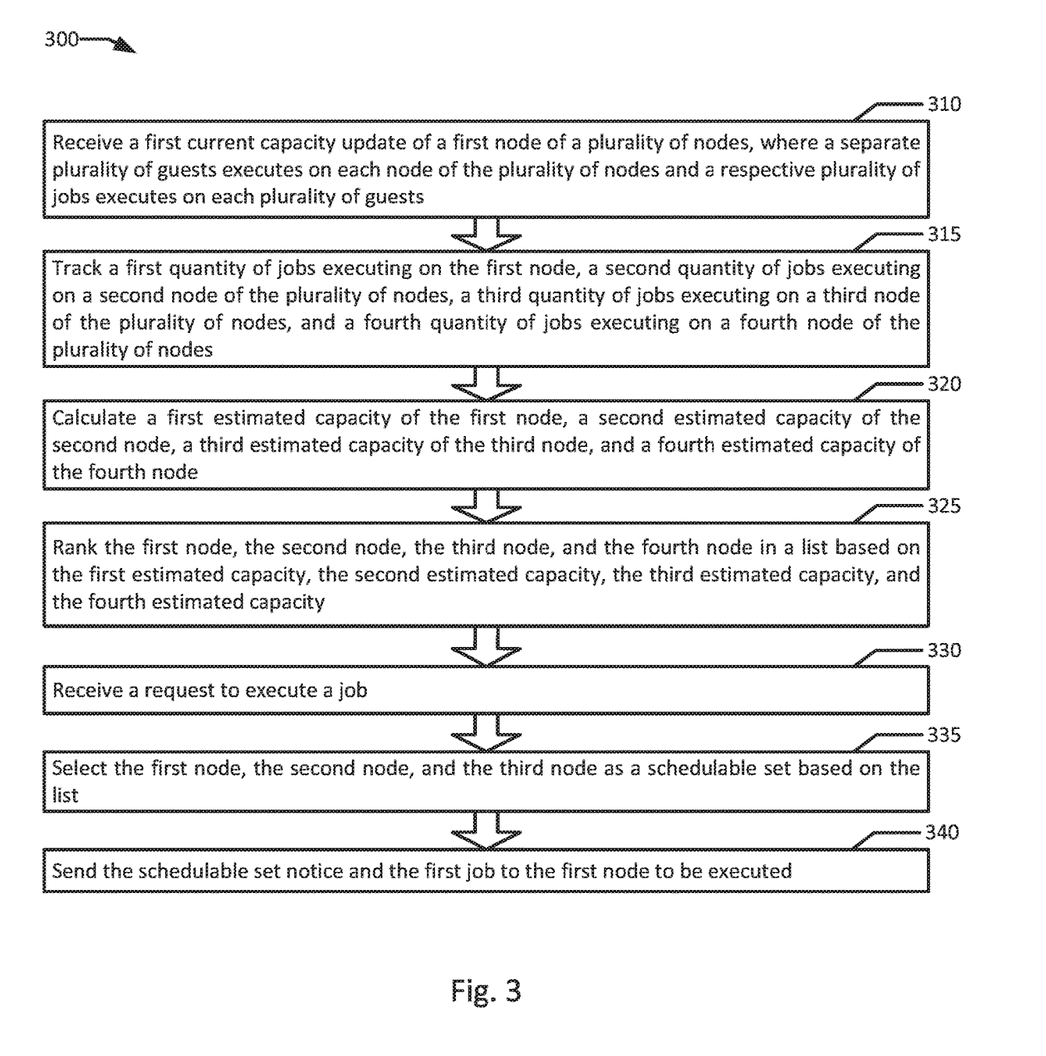
FIG. 3 is a flowchart illustrating an example of cascading job scheduling in guests according to an example of the present disclosure.

FIG. 3 is a flowchart illustrating an example of cascading job scheduling in guests according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by a scheduler 140 in conjunction with nodes 112, 114, and/or 116.

Example method 300 may begin with receiving a first current capacity update of a first node of a plurality of nodes, where a separate plurality of guests executes on each node of the plurality of nodes and a respective plurality of jobs executes on each plurality of guests (block 310). In an example, scheduler 140 receives a current capacity update from node 112, where node 112 hosts containers 160A-D executing jobs 150A-C, node 114 hosts containers 161A-D executing jobs 151A-D, and node 116 hosts containers 162A-D executing jobs 152A-C. For example, the current capacity update includes (i) a current quantity of vacant guests (e.g., 1) in the node 112, (ii) a current quantity of jobs (e.g., 3) executing on node 112, (iii) a current quantity of guests executing on node 112 (e.g., 4), (iv) an average execution time of completed anonymous jobs executed by node 112, and/or (v) an execution time of completed jobs executed by node 112. In an example the current capacity update from node 112 may be sent based on (i) an elapsed time since a previous capacity update, (ii) a quantity of vacant guests (e.g., container 160D) in node 112, and/or (iii) a percentage of vacant guests in node 112 (e.g., 20%). In an example, scheduler 140 may receive 1,000 current capacity updates per second without a meaningful degradation in performance due to network interrupts. In the example, if scheduler 140 manages scheduling for 200 nodes, each node may be configured to issue updates on a roughly 200 ms cycle. Increasing the number of nodes up to 1,000 nodes may then result in an update cycle of 1,000 ms per node to maintain the same 1,000 updates per second rate. In an example, the lower the granularity of updates to the scheduler 140, the larger the error in current capacity of each node may be when scheduler 140 evaluates nodes for constructing a schedulable set. In an example, scheduler 140 may be configured with additional estimation techniques based on the granularity of updates from each node. In an example, by the time scheduler 140 receives a current capacity update from any given node, the capacity represented by the current capacity update may already be somewhat stale. For example, certain anonymous jobs may be processed in microseconds while a current capacity update may take several milliseconds to send due to network latency. In an example, the level of staleness in the data in a current capacity update may be influenced by factors such as network latency and update frequency, as well as one off events such as network interruptions necessitating retransmission. In an example, current capacity updates may include a timestamp indicating when the capacity snapshot was taken to assist scheduler 140 in estimating the current vacancies in a given node. In an example, absolute accuracy of current capacity updates may be unnecessary due to the cascading of jobs assigned exceeding the processing capacity of a given node.

In an example, each of jobs 150A-C, 151A-D, and 152A-C may be anonymous jobs with varying and unpredictable execution times. For example, some of the anonymous jobs scheduled by scheduler 140 may belong to a shopping website. In one example, an anonymous job that sorts the items in a shopping cart alphabetically may execute in 1 ms or less. However, an anonymous job may be much more complex. For example, a user may log into the site, and the site may prompt the user that their monthly recurring purchase of dog food should be repurchased. The site may implement a JavaScript element as an anonymous function to save on loading time that, when clicked by the user, takes the user's account credentials and an item ID for the dog food as inputs. In an example, the shopping site may not need to wait for a return value from the anonymous function, for example, because purchase confirmation is later sent by e-mail, so the anonymous function may execute independently of the website code while the user continues to shop. In the example, the anonymous function may be scheduled to a container supporting JavaScript code and may start by retrieving the user's stored payment information, address on record, and email information from various databases based on the account credentials input. While the records are being retrieved, the anonymous function may also retrieve inventory information of the dog food based on the item ID to determine where the dog food will be sent from. A third task may entail verifying payment information (e.g., with a credit card provider). Having located the item from a proper warehouse, the function may send a shipping label to the warehouse while sending a purchase confirmation to the user's email address. In an example, the dog food purchasing anonymous function may have taken many seconds, even upwards of a minute to fully execute while waiting on inputs and responses. In an example, the request being scheduled by scheduler 140 may be similar in size in both instances. In an example the first anonymous function may actually be the longer message, for example, the first request for sorting may have numerous text inputs as compared to a few short calls to other components for retrieving the necessary information to execute the second anonymous function. In an example, scheduler 140 may be unable to determine the true complexity of an anonymous function without executing the function, which would in many cases defeat the advantages of parallel processing through implementing numerous containers on VM nodes.

The example method 300 includes tracking a first quantity of jobs executing on the first node, a second quantity of jobs executing on a second node of the plurality of nodes, a third quantity of jobs executing on a third node of the plurality of nodes, and a fourth quantity of jobs executing on a fourth node of the plurality of nodes (block 315). In an example, scheduler 140 may track a respective quantity of jobs executing on each of nodes 112, 114, 116 and a fourth node. For example, scheduler 140 may track that three jobs (e.g., jobs 150A-C) are executing on node 112, four jobs (e.g., jobs 151A-D) are executing on node 114, and four jobs (e.g., jobs 152 A-C) are executing on node 116. Alternatively, scheduler 140 may track vacancies on each node rather than executing jobs (e.g., one vacancy 155A on node 112 and one vacancy 155B on node 116). In an example, scheduler 140 may track the respective quantities of executing jobs based on current capacity updates from each of the nodes scheduler 140 is responsible for scheduling.

The example method 300 further includes calculating a first estimated capacity of the first node, a second estimated capacity of the second node, a third estimated capacity of the third node, and a fourth estimated capacity of the fourth node (block 320). In an example, scheduler 140 calculates estimated capacities for nodes 112, 114, 116 and a fourth node. In the example, scheduler 140 may calculate the estimated capacities based on current capacity updates tracked for each node. In an example, current capacity updates for each node (e.g., nodes 112, 114, and 116) may arrive in a staggered fashion, such that sending new jobs to the node with the highest reported vacancy is a close enough approximation to be sufficiently efficient even where the updates are moderately stale. However, in the example, the rate at which the scheduler 140 receives updates may be limited by constraints such as interrupt handling, and therefore as the scheduler 140 becomes responsible for hundreds, even thousands of VM nodes, update frequency from each node may need to be scaled down creating greater staleness of data.

In an example, scheduler 140 may further calculate an average execution rate of jobs on the nodes the scheduler manages (e.g., nodes 112, 114, 116). In the example, a representative average or other statistical measure (e.g., arithmetic mean, Pythagorean mean, geometric mean, median, mode, weighted or unweighted average, standard deviation) may be selected to use as an offset against the reported capacity from a current capacity update. For example, if updates arrive every 10 seconds, and on average a given node completes a job per second, scheduler 140 may calculate that an additional five vacancies should exist on a given node that last reported 5 seconds ago. In an example, scheduler 140 may further track the number of jobs sent to a given node since its last update and decrease estimated capacity based on the jobs sent. In an example, different weights may be assigned to the tracking of jobs sent based on the positioning of the node in a schedulable set, for example, to account for the likelihood that a given job ended up on a given node. In an example, some nodes may execute named as well as anonymous jobs, and the named jobs may have very predictable execution times. In such an example, estimated capacity on a given node may be adjusted to account for known statistics for named jobs as well. In a further example, the scheduler may schedule named jobs along with anonymous jobs. In an example, execution metrics and capacity calculation adjustments may treat named jobs as additional anonymous jobs. In another example, actual metrics for at least a commonly executed subset of named jobs may be kept for more accurate estimation of capacity.

The first, second, third, and fourth nodes are ranked in a list based on the first, second, third, and fourth estimated capacities (block 325). In an example, scheduler 140 may track a running estimate of the current capacity of each of nodes 112, 114, 116, and a fourth node. In an example, nodes 112, 114, 116, and the fourth node may be configured to report their current capacity every five seconds. In another example, nodes 112, 114, 116, and the fourth node may be configured to send a current capacity update whenever a set number and/or a set percentage of their respective guests (e.g., containers 160A-D, 161A-D, and 162A-D) are available for executing jobs. In an example, if each of the nodes 112, 114, 116, and the fourth node are hosting 200 containers, the threshold may be configured at 30 vacancies and/or a 15% vacancy rate. In an example, there is a strong likelihood that current capacity updates received from different nodes may arrive in a staggered fashion, for example, due to varying completion rates for individual anonymous jobs. In the example, between two updates from any given node, the scheduler 140 may be configured to account for an average execution rate of anonymous jobs to increase the estimated capacity of a given node. Similarly, the scheduler 140 may account for the number of jobs expected to be executing on a given node based on the number of jobs sent to the node since the last current capacity update.

In an example, node 112 may host 200 containers. In an example with only four nodes, node 112 may update scheduler 140 every 40 ms. In another example with 500 nodes, node 112 may update scheduler 140 every 1 second. In the example, scheduler 140 may track metrics indicating that the median anonymous job scheduled by the scheduler 140 takes two seconds to execute, with a two minute timeout on the longest running jobs. In the example, node 112 may report 30 vacancies out of 200 containers. Then, 200 ms later, the scheduler 140 may have an anonymous job to schedule, of a type that node 112 is capable of executing. Scheduler 140 may take the last update from node 112, and calculate that the throughput of node 112 may be on average, 100 jobs per second based on 200 containers and with a 2 second median execution time. The scheduler 140 may therefore estimate that node 112 has a capacity of 50 vacancies 200 ms after an update based on the reported 30 vacancies and an estimated additional 20 vacancies over the last 200 ms. The scheduler 140 may then account for having sent 45 jobs to node 112 in the last 200 ms, and determine that there is likely still five vacancies, therefore making node 112 a likely candidate for having a vacancy for a new job. Alternatively, if 52 jobs have been sent in the last 200 ms, there may be a high likelihood that node 112 may have to forward the job down the schedulable set, and therefore putting node 112 lower on the schedulable set is likely advantageous due to saving at least one network hop. In an example, scheduler 140 may dynamically calculate a schedulable set for each job in a scheduling queue. In another example, a calculated schedulable set may be associated with a batch of jobs to reduce calculation times. For example, where the scheduler 140 estimates that node 112 may have 40 current vacancies and node 114 may have 30 current vacancies, the scheduler 140 may safely send the next 45 jobs all to node 112 with node 114 as the second node on a schedulable set for the 45 jobs. In the example, for a higher confidence interval, a third node may be appended to each schedulable set for the 45 jobs. In an example, the third node may be randomly selected to spread out the cascade effect if nodes 112 and 114 are having throughput issues when the 45 jobs are received.

In an example, the scheduler 140 may track metrics on jobs from different user accounts or user groups separately, as origin may influence the execution times of the anonymous jobs from a particular source. For example, user A's jobs may execute with a median execution time of 500 ms (e.g., small jobs for comparisons), while user B's jobs may execute with a median execution time of 10 seconds (e.g., fully automated order fulfilment systems). In an example, node 112 may include information regarding long running jobs (e.g., those running over 5 seconds) in a current capacity update. In the example, due to a high likelihood that a job running over 5 seconds may run for the entire 2 minute timeout window, a temporary decrease in scheduler 140's estimation of node 112's maximum capacity may require adjustment where multiple long running jobs have locked up containers.

The example method 300 includes receiving a request to execute a job (block 330). In an example, the request may be received by scheduler 140 in any suitable form. In an example, scheduler 140 may be associated with a job queue for scheduling jobs, and may retrieve a job to schedule based on time in queue and/or a priority value of the request. In an example, a given request may require a particular type of container to execute. For example, a request may require execution of an anonymous function in a Perl® script. In such an example, scheduler 140 may first determine a subset of nodes managed by the scheduler with containers that have Perl® installed. For example, nodes 112, 114, and 116 may each execute 200 containers, but node 112 may execute 100 containers with Perl®, while nodes 114 and 116 may execute only 40 containers each with Perl® installed. In the example, scheduler 140 may account for differences between total capacity and capacity supporting the request on each node prior to scheduling the request.

The first node, the second node, and the third node are selected as a schedulable set based on the list (block 335). In an example, scheduler 140 selects nodes 112, 114, and 116 in that order as a schedulable set for the requested job. In an example, the fourth node may be excluded for not supporting the request type of the requested job. In another example, the fourth node may have recently been included in a sufficient number of schedulable sets such that the scheduler 140 determines that it is unlikely for the fourth node to have any current capacity. In an example, the scheduler 140 bases the order of nodes in the schedulable set on estimated calculations of current capacity. In another example, the reporting frequency of current capacity updates may be sufficiently more frequent that the average execution time of jobs that using the reported capacity directly provides a close enough estimate of current capacity for scheduling purposes. In an example, node 112 may have higher estimated current capacity than node 114, which has a higher estimated current capacity than node 116. In an example, a confidence interval may be computed representing a probability of successful execution of a given job by at least one node included in a schedulable set. In the example, scheduler 140 may be configured to include a certain quantity of nodes in each schedulable set based on the confidence interval. In an example, each transfer from node to node may incur a 2 ms-10 ms network delay. Therefore, a balance may be desirable between a long schedulable set that virtually guarantees execution, and a shorter schedulable set where more rescheduling may be performed by scheduler 140, but where scheduler 140 may use more up to date information regarding current node capacities in generating a second schedulable set. For example, if each node in a given schedulable set has a 90% chance to execute a given job, a schedulable set of 3 nodes may have a 99.9% chance at execution while a schedulable set of 5 nodes may have a 99.999% chance at execution.

A schedulable set notice and the first job are sent to the first node to be executed. (block 340). In an example, the scheduler 140 sends a schedulable set notice and the requested job to node 112 to be executed. In an example, the schedulable set notice may include each node in the schedulable set. In another example, the schedulable set may include a subset of the nodes in the schedulable set, such as nodes further down the schedulable set than a current recipient. In an example, the first receiving node (e.g., node 112) may be excluded from the schedulable set notice. In an example, a schedulable set notice may be sent in the form of a file, metadata, header, wrapper or in any other suitable form for rapid interpretation by a receiving node. In an example, node 112 may execute the job. In another example, node 112 may be out of capacity and forward the job and the schedulable set notice to node 114. In an example, node 114 may execute the job. In another example, node 114 may be out of capacity and forward the job and the schedulable set notice to node 116. In an example, node 116 may execute the job. In another example, node 116 may recognize that node 116 is both out of capacity, and that node 116 is the last node on the schedulable set. In the example, node 116 may forward the job back to a scheduling queue of scheduler 140 for rescheduling. In an example, a rescheduling request may be scheduled by scheduler 140 on with high priority, potentially skipping other jobs in the queue. In an example, scheduler 140 may reschedule the job sending the job to the fourth node with a new schedulable set notice based on a new schedulable set. In an example, each of nodes 112, 114, and/or 116 may be implemented with a queue and/or a delay for a given request to smooth out capacity usage before forwarding the job and the schedulable set to the next node. For example, if transferring the schedulable set notice and job from node 112 to node 114 would incur a 5 ms network transfer latency penalty, a 3 ms delay to attempt to reschedule the job on node 112 first may result in a net gain in efficiency.

In various examples, anonymous jobs may be written in different programming languages and require different libraries to be installed on a given guest (e.g., container) to execute the respective anonymous jobs. For example, container 160A may execute anonymous jobs written in Perl®, while container 160B may execute anonymous jobs written in PHP®. In an example, both containers 160A and 160B may execute anonymous jobs written in JavaScript®. In an example, scheduler 140 may send a Perl® anonymous job to node 112 while container 160A is executing another job, but container 160B is vacant. In the example, since container 160B may be incapable of executing the Perl® job, node 112 forwards the Perl® job along with an associated schedulable set notice to node 114.

Figure 4:
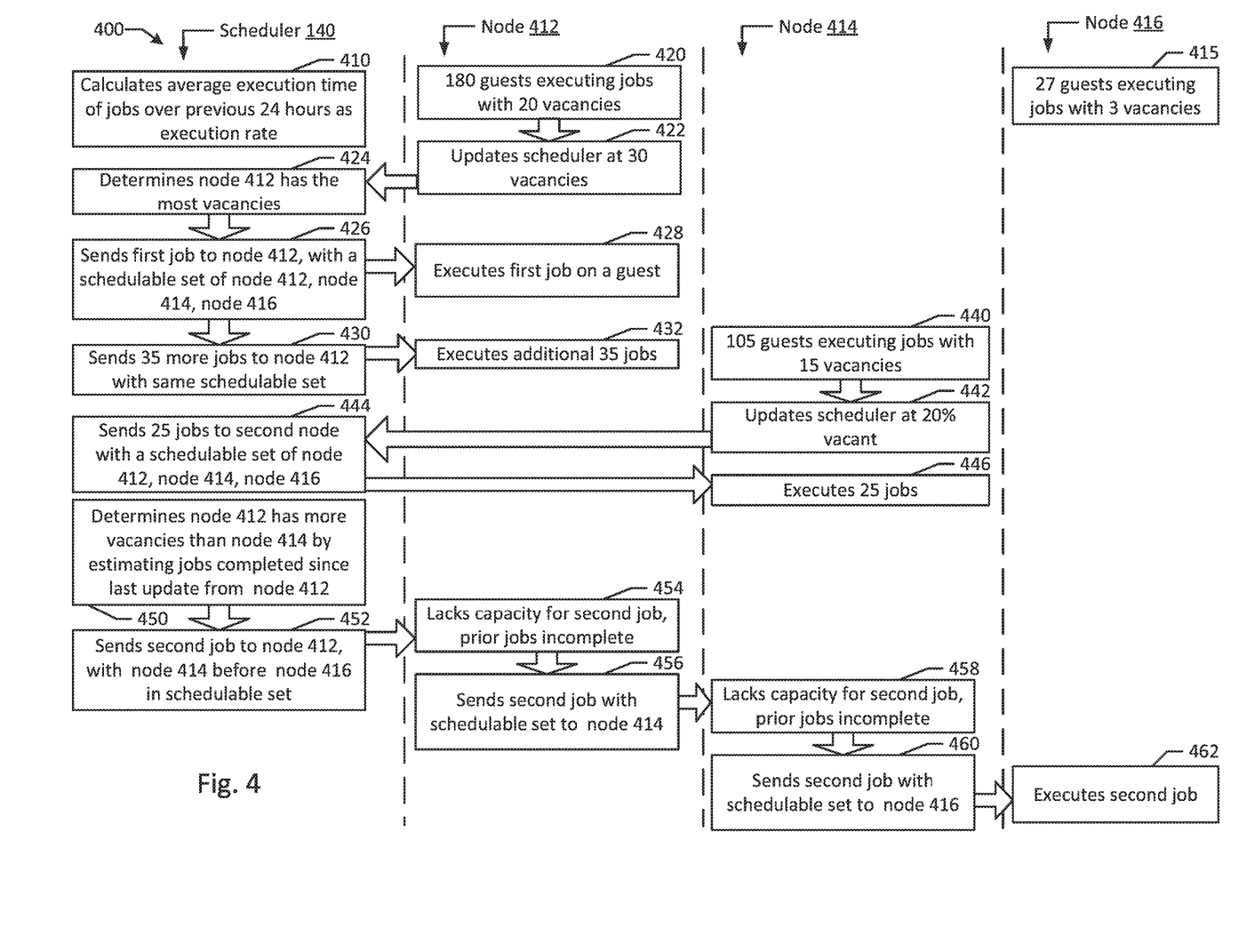
FIG. 4 is flow diagram of an example of cascading job scheduling in guests according to an example of the present disclosure.

FIG. 4 is flow diagram of an example of cascading job scheduling in guests according to an example of the present disclosure. Although the examples below are described with reference to the flowchart illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, scheduler 140 executes to schedule anonymous jobs executing on guests hosted on nodes 412, 414, and 416.

In example system 400, scheduler 140 may calculate average execution times of anonymous jobs over the previous 24 hours as an execution rate of anonymous jobs in system 400 (block 410). In an example, node 412 has 200 total guests, with 180 guests executing jobs and 20 vacancies (block 420). In the example, node 412 may be configured to update scheduler 140 when 30 vacancies and/or 15% total vacancies are present. Node 412 then sends a current capacity update to scheduler 140 notifying scheduler 140 that there are 30 vacancies on node 412 (block 422). In the example, node 414 may host 120 guests and update the scheduler 140 at 20% vacancies, while node 416 may host 200 guests and update the scheduler at 25% vacancies. Based on the update, scheduler 140 determines that node 412 has the most current vacancies (block 424). In an example, scheduler 140 receives a request to schedule a first job, and sends the first job to node 412 with a schedulable set of node 412, followed by node 414, and then followed by node 416 (block 426). In the example, node 412 executes the first job on a guest (block 428). In an example, based on when the jobs arrive and the previous current capacity update from node 412, scheduler 140 sends the next 35 jobs to node 412 with the same schedulable set of node 412, followed by node 414, and then followed by node 416 (block 430). In the example, node 412 executes the additional 35 jobs (block 432).

In an example, node 414 may host 120 total guests with 105 guests executing jobs and 15 vacancies (block 440). In the example, node 414 may be configured to update scheduler 140 when node 414 reaches 20% vacant. In an example, node 414 reaches 24 vacancies while node 412 is executing the 35 jobs, and notifies scheduler 140 that there are 24 vacancies on node 414 (block 442). In an example, scheduler 140 then sends the next 25 jobs to node 414 with a schedulable set of node 414, node 412, then node 416 (block 444). In an example, node 414 executes the 25 jobs (block 446).

In an example, scheduler 140 then receives a request to execute another anonymous job. Based on the previous current capacity updates, both node 412 and node 414 have been sent more jobs than their declared vacancies already, while node 416 has not sent a current capacity update. In an example, scheduler 140 may determine that node 412 has more vacancies than node 414 by estimating the jobs that should have been completed since the last update from node 412 (block 450). In the example, scheduler 140 may send the new job to node 412 with a schedulable set notice including node 412, node 414, and then node 416 (block 452). Node 412, upon receiving the new job and schedulable set notice, determines that node 412 lacks capacity for the new job due to the previous jobs taking up capacity (block 454). In the example, node 412 may send the new job with the schedulable set notice of node 412, node 414, and node 416 to node 414 (block 456). In the example, node 414, upon receiving the new job and schedulable set notice, determines that node 414 lacks capacity for the new job due to the previous jobs taking up capacity (block 458). In the example, node 414 may send the new job with the schedulable set notice of node 412, node 414, and node 416 to node 416 (block 460). In an example, node 416 may have 27 guests executing jobs with 3 vacancies (block 415). In the example, node 416 may host 200 total guests, but only 30 have the right libraries to support the requested job. In an example, due to long running jobs, node 416 has not breached its 25% vacancy notification threshold. In an example, node 416 may be configured to send updates to scheduler 140 based on total vacancy rates for the 200 hosted guests. In an example, node 416 may be configured to send updates to scheduler 140 independently for each type of executing guest (e.g., for guests supporting different anonymous jobs in different languages). In an example, node 416 executes the new job in one of its vacancies (block 462).

Figure 5:
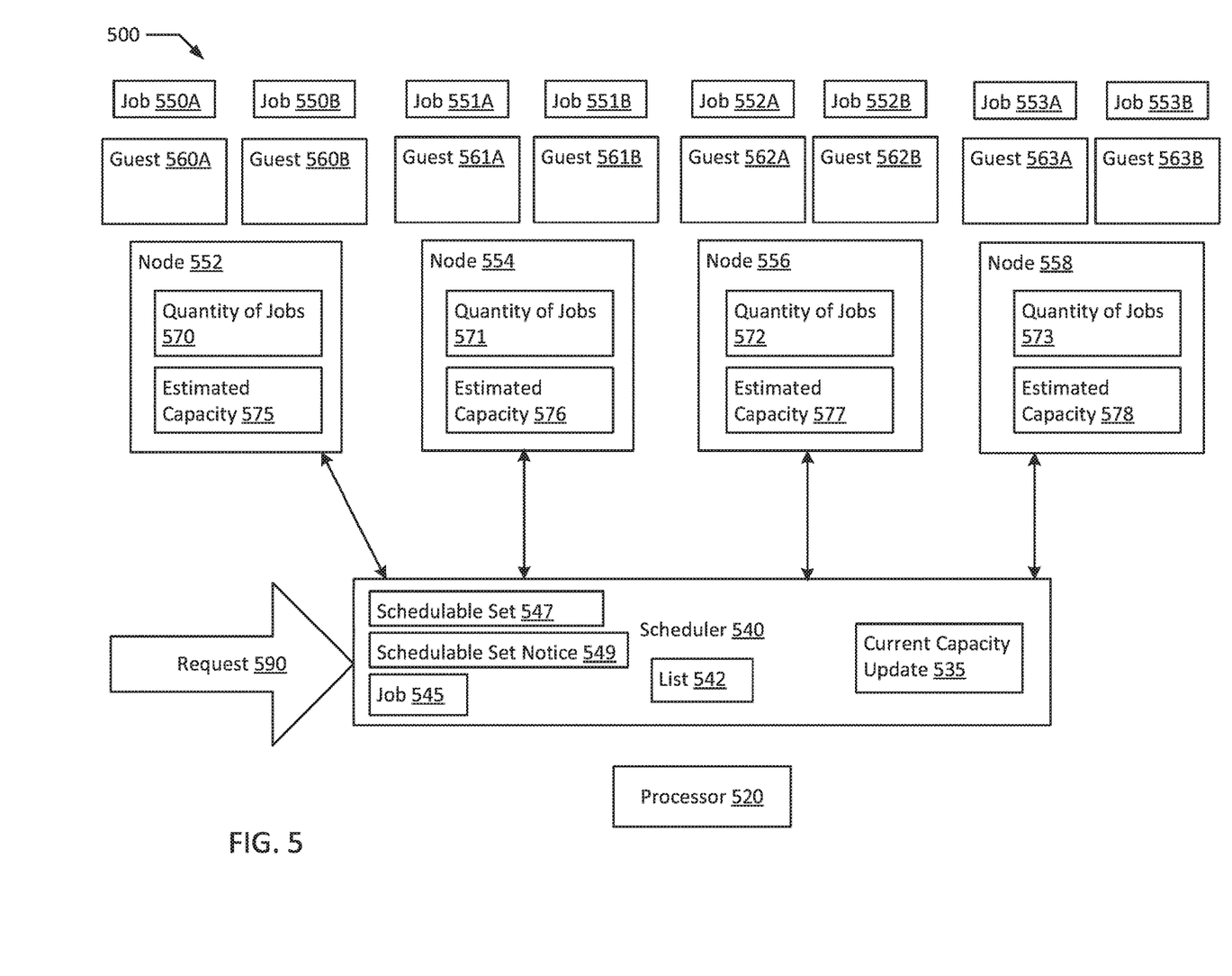
FIG. 5 is a block diagram of an example system for cascading job scheduling in guests according to an example of the present disclosure.

FIG. 5 is a block diagram of an example system for cascading job scheduling in guests according to an example of the present disclosure. Example system 500 includes nodes 552, 554, 556, and 558. Node 552 executes guests 560A-B which respectively execute jobs 550A-B. Node 554 executes guests 561A-B which respectively execute jobs 551A-B. Node 556 executes guests 562A-B which respectively execute jobs 552A-B. Node 558 executes guests 563A-B which respectively execute jobs 553A-B. A scheduler 540 executes on processor 520 to receive current capacity update 535 from node 552. Scheduler 540 tracks a respective quantity of jobs (e.g., quantities of jobs 570, 571, 572, and 573) executing on each of nodes 552, 554, 556 and 558 respectively. Scheduler 540 calculates an estimated capacity (e.g., estimated capacities 575, 576, 577, and 578) of each of nodes 552, 554, 556 and 558 respectively. Scheduler 540 ranks nodes 552, 554, 556, and 558 in a list 542 based on estimated capacities 575, 576, 577, and 578. Scheduler 540 receives a request 590 to execute job 545 and selects node 552, node 554, and node 556 as a schedulable set 547 based on list 542. Scheduler 540 then sends the schedulable set notice 549 and job 545 to node 552 to be executed.

In an example, cascading job scheduling in guests may greatly increase the efficiency and usage rate of processing capacity for guests used to execute anonymous functions. In an example, a scheduler may only receive a limited number of updates from systems it controls before reaching a point of diminishing returns. For example, each capacity update received may require a network transmission, which may trigger an interrupt on the system hosting the scheduler. After a certain level of interrupts that require handling by the system hosting the scheduler, the scheduler may be incapable of executing its core function of scheduling jobs, or alternatively, fail-safes may start dropping network messages before that point is reached. Therefore, the scheduler may be tasked with estimating capacities based on inherently unpredictable anonymous jobs, which may require significant overprovisioning of resources per job in order to ensure a high likelihood of timely scheduling. In addition, the scheduler may require an acknowledgement from a node that a job has been successfully scheduled. In contrast, by transferring secondary scheduling, where the original primary node receiving a job lacks capacity for the job to the node rejecting the job, the scheduler may require far fewer capacity updates, and acknowledgements for successful scheduling may be eliminated altogether on the assumption that after an initial scheduling, the scheduler would only be involved with the same anonymous job again in the very rare (e.g., 0.001% of cases) situations where the entire schedulable set fails to schedule the job. By adding a parallel processing element to an inherently serial processing task by the scheduler, cascading job scheduling in guests allows for significantly higher usage of systems with inherently unpredictable availability such as nodes hosting guests executing anonymous jobs.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a plurality of nodes, including a first node, a second node, a third node, and a fourth node, wherein separate pluralities of guests execute on each node of the plurality of nodes, including a first plurality of guests on the first node, a second plurality of guests on the second node, a third plurality of guests on the third node, and a fourth plurality of guests on the fourth node, wherein each seperate plurality of guests executes a respective plurality of jobs including a first plurality of jobs on the first plurality of guests, a second plurality of jobs on the second plurality of guests, a third plurality of jobs on the third plurality of guests, and a fourth plurality of jobs on the fourth plurality of guests;
one or more processors; and
a scheduler executing on the one or more processors to:
receive a current first capacity update of the first node;
track a first quantity of jobs executing on the first node, a second quantity of jobs executing on the second node, a third quantity of jobs executing on the third node, and a fourth quantity of jobs executing on the fourth node;
calculate, a first estimated capacity of the first node, a second estimated capacity of the second node, a third estimated capacity of the third node, and a fourth estimated capacity of the fourth node;
rank the first node, the second node, the third node, and the fourth node in a list based on the first estimated capacity, the second estimated capacity, the third estimated capacity, and the fourth estimated capacity;
receive a request to execute a first job;
select the first node, the second node, and the third node as a schedulable set based on the list; and
send, a schedulable set notice based on the schedulable set and the first job to the first node to be executed, wherein the schedulable set notice sent to the first node includes the schedulable set.

2. The system of claim 1, wherein the first job and each of the first plurality of jobs, the second plurality of jobs, the third plurality of jobs, and the fourth plurality of jobs are anonymous jobs, wherein anonymous jobs have varying and unpredictable execution times.

3. The system of claim 2, wherein the first capacity update includes at least one of (i) a current quantity of vacant guests in the first node, (ii) a current quantity of jobs in the first plurality of jobs, (iii) a current quantity of guests in the first plurality of guests, (iv) an average execution time of completed jobs in the first plurality of jobs, and (v) an execution time of completed jobs in the first plurality of jobs.

4. The system of claim 3, wherein the first capacity update is sent based on at least one of (i) an elapsed time since a previous capacity update, (ii) a quantity of vacant guests in the first node, and (iii) a percentage of vacant guests in the first node.

5. The system of claim 3, wherein an average execution rate of jobs on the plurality of nodes is calculated, and the first estimated capacity is calculated based on the first capacity update adjusted by the average execution rate of jobs to account for jobs completed since the first capacity update was received.

6. The system of claim 5, wherein the first estimated capacity is further adjusted by a quantity of jobs sent to the first node by the scheduler since the first capacity update was received.

7. The system of claim 6, wherein the first estimated capacity is further adjusted based on a named job of predictable execution rate executing on the first node.

8. The system of claim 2, wherein an elapsed time between receiving the first capacity update and receiving a second capacity update of the first node is increased as a result of an addition of a fifth node including a fifth plurality of guests and a fifth plurality of jobs.

9. The system of claim 1, wherein the first node lacks capacity to execute the first job and forwards the schedulable set notice and the first job to the second node.

10. The system of claim 9, wherein the schedulable set notice forwarded to the second node includes less than all of the nodes in the schedulable set.

11. The system of claim 9, wherein the second node lacks capacity to execute the first job and forwards the schedulable set notice and the first job to the third node.

12. The system of claim 11, wherein the third node executes the first job.

13. The system of claim 11, wherein the third node notifies the scheduler of a failure to execute the first job by the schedulable set, a new schedulable set including the fourth node is selected by the scheduler, and a new schedulable set notice based on the new schedulable set and the first job are sent to the fourth node.

14. The system of claim 1, wherein a first guest of the first plurality of guests is configured to execute jobs in a first language and a second guest of the first plurality of guests is configured to execute jobs in a different second language.

15. The system of claim 14, wherein the first job is in the first language, the first guest is in an occupied state, the second guest is in a vacant state, and the first node forwards the schedulable set notice and the first job to the second node.

16. The system of claim 1, wherein a quantity of nodes in the schedulable set is based on a confidence interval of a probability of successful execution of the first job by at least one node in the schedulable set.

17. The system of claim 1, wherein each guest in the first plurality of guests, the second plurality of guests, the third plurality of guests, and the fourth plurality of guests is a container.

18. A method comprising:
receiving a current first capacity update of a first node of a plurality of nodes, wherein a separate plurality of guests executes on each node of the plurality of nodes and a respective plurality of jobs executes on each seperate plurality of guests;
tracking a first quantity of jobs executing on the first node, a second quantity of jobs executing on a second node of the plurality of nodes, a third quantity of jobs executing on a third node of the plurality of nodes, and a fourth quantity of jobs executing on a fourth node of the plurality of nodes;
calculating, a first estimated capacity of the first node, a second estimated capacity of the second node, a third estimated capacity of the third node, and a fourth estimated capacity of the fourth node;
ranking the first node, the second node, the third node, and the fourth node in a list based on the first estimated capacity, the second estimated capacity, the third estimated capacity, and the fourth estimated capacity;
receiving a request to execute a first job;

selecting the first node, the second node, and the third node as a schedulable set based on the list; and sending, a schedulable set notice based on the schedulable set and the first job to the first node to be executed, wherein the schedulable set notice sent to the first node includes the schedulable set.

19. The method of claim 18, further comprising:

forwarding, by the first node, the schedulable set notice and the first job to the second node;

forwarding, by the second node, the schedulable set notice and the first job to the third node;

notifying, by the third node, a scheduler of a failure to execute the first job by the schedulable set;

selecting, a new schedulable set including the fourth node; and sending the first job and a new schedulable set notice based on the new schedulable set to the fourth node.

20. A computer-readable non-transitory storage medium storing executable instructions, which when executed by a computer system, cause the computer system to:

receive a current first capacity update of a first node of a plurality of nodes, wherein a separate plurality of guests executes on each node of the plurality of nodes and a respective plurality of jobs executes on each seperate plurality of guests;

track a first quantity of jobs executing on the first node, a second quantity of jobs executing on a second node of the plurality of nodes, a third quantity of jobs executing on a third node of the plurality of nodes, and a fourth quantity of jobs executing on a fourth node of the plurality of nodes;

calculate, a first estimated capacity of the first node, a second estimated capacity of the second node, a third estimated capacity of the third node, and a fourth estimated capacity of the fourth node;

rank the first node, the second node, the third node, and the fourth node in a list based on the first estimated capacity, the second estimated capacity, the third estimated capacity, and the fourth estimated capacity;

receive a request to execute a first job;

select the first node, the second node, and the third node as a schedulable set based on the list; and send, a schedulable set notice based on the schedulable set and the first job to the first node to be executed, wherein the schedulable set notice sent to the first node includes the schedulable set.

* * * * *